US012616186B2

(12) United States Patent
Bouchonneau

(10) Patent No.: US 12,616,186 B2
(45) Date of Patent: May 5, 2026

(54) LABYRINTH FOR CAPTURING AND DESTROYING MOSQUITO LARVAE

(71) Applicants: ARACHNOIDE SARL, Saint Barthélemy (FR); Stephane Cloquell, Saint Barthélemy (FR)

(72) Inventor: Ludovic Bouchonneau, Le Lamentin (FR)

(73) Assignees: ARACHNOIDE SARL, Saint Barthélemy—Guadeloupe (FR); Stephane CLOQUELL, Saint Barthélemy—Guadeloupe (FR)

( * ) Notice: Subject to any disclaimer, the term of this patent is extended or adjusted under 35 U.S.C. 154(b) by 0 days.

(21) Appl. No.: 18/729,421

(22) PCT Filed: Jan. 17, 2023

(86) PCT No.: PCT/EP2023/051019
§ 371 (c)(1),
(2) Date: Jul. 16, 2024

(87) PCT Pub. No.: WO2023/135332
PCT Pub. Date: Jul. 20, 2023

(65) Prior Publication Data
US 2025/0113812 A1 Apr. 10, 2025

(30) Foreign Application Priority Data
Jan. 17, 2022 (FR) ........................................ 2200340

(51) Int. Cl.
A01M 1/10 (2006.01)
(52) U.S. Cl.
CPC .................................... A01M 1/106 (2013.01)
(58) Field of Classification Search
CPC ............ A01M 1/106; A01M 2200/011; A01M 1/2011; A01M 25/004; A01M 23/00
(Continued)

(56) References Cited

U.S. PATENT DOCUMENTS 529,109 A * 11/1894 Burgess ................ A01M 1/103
43/121
1,812,512 A * 6/1931 Carballo ................. A01M 1/10
43/107
(Continued)

FOREIGN PATENT DOCUMENTS

CN 209251484 U 8/2019
CN 210901055 U 7/2020
(Continued)

OTHER PUBLICATIONS

International Search Report and Written Opinion for International Application No. PCT/EP2023/051019, dated May 15, 2023, and English Translation attached (9 pages).
(Continued)

*Primary Examiner* — Timothy D Collins
*Assistant Examiner* — Maria E Graber
(74) *Attorney, Agent, or Firm* — Maier & Maier, PLLC

(57) ABSTRACT

The invention relates to a compact, low-profile aquatic trap designed to be directly submerged in mosquito larval habitats, aimed at capturing and retaining them underwater long enough to kill them by lack of air. The entrance of the trap includes multiple niche-like openings to trap the larvae by offering them shelter from light and predators. These entrances lead to a series of compartments that form a labyrinth guiding the larvae towards an inescapable chamber. Being anaerobic, the trap causes the larvae to die in the inescapable chamber within a few hours, without bait, chemicals, energy, or any kind of refills.

3 Claims, 8 Drawing Sheets

Section A-A

(58) Field of Classification Search
USPC .......................................... 43/107, 121, 131
See application file for complete search history.

(56) References Cited

U.S. PATENT DOCUMENTS

| | | | | |
|---|---|---|---|---|
| 2,340,255 | A * | 1/1944 | Weil ..................... | A01M 1/2011 |
| | | | | 43/131 |
| 3,341,967 | A * | 9/1967 | Kelley .................... | A01M 1/10 |
| | | | | 43/65 |
| 3,908,302 | A * | 9/1975 | Carr ........................ | A01M 1/02 |
| | | | | 43/121 |
| 3,968,590 | A * | 7/1976 | Kitterman ............... | A01M 1/02 |
| | | | | 43/107 |
| 4,228,613 | A * | 10/1980 | Kalnasy .............. | A01M 25/004 |
| | | | | 43/131 |
| 4,400,904 | A * | 8/1983 | Baker ................. | A01M 25/004 |
| | | | | 43/131 |
| 4,453,337 | A * | 6/1984 | Williams ............ | A01M 25/004 |
| | | | | 119/51.01 |
| 4,501,088 | A * | 2/1985 | Boisvert ................ | A01M 1/02 |
| | | | | 43/118 |
| 4,550,525 | A * | 11/1985 | Baker ................. | A01M 25/004 |
| | | | | 43/131 |
| 4,563,836 | A * | 1/1986 | Woodruff ........... | A01M 1/2016 |
| | | | | 43/131 |
| 5,048,225 | A * | 9/1991 | Brandli ............... | A01M 1/2011 |
| | | | | 43/131 |
| 5,275,125 | A * | 1/1994 | Rotramel ................. | A01K 1/00 |
| | | | | 43/131 |
| 5,378,086 | A * | 1/1995 | Campbell, Jr. ....... | A01M 1/245 |
| | | | | 43/130 |
| 5,857,428 | A * | 1/1999 | Gitzen .................... | A01M 1/24 |
| | | | | 119/61.53 |
| 6,460,288 | B1 * | 10/2002 | Chow ................. | A01M 1/2011 |
| | | | | 43/107 |
| 6,735,899 | B1 * | 5/2004 | Anderson ............. | A01M 23/04 |
| | | | | 43/98 |
| 6,886,293 | B2 | 5/2005 | Forehand | |
| 8,448,376 | B2 * | 5/2013 | Kagawa ................ | A01M 1/106 |
| | | | | 43/107 |
| 8,950,108 | B1 * | 2/2015 | Morris ................. | A01M 1/106 |
| | | | | 43/107 |
| 9,877,487 | B2 * | 1/2018 | Nchekwube ......... | A01N 25/006 |
| 10,869,470 | B2 * | 12/2020 | Bittlinger ............ | A01M 25/004 |
| 12,256,726 | B2 * | 3/2025 | Suteerawanit ...... | A01M 23/005 |
| 2005/0210735 | A1 * | 9/2005 | Harmer ................... | A01M 1/02 |
| | | | | 43/107 |
| 2011/0154718 | A1 * | 6/2011 | Braun ................... | A01M 29/34 |
| | | | | 43/132.1 |
| 2012/0186136 | A1 * | 7/2012 | Schneidmiller ......... | A01M 1/04 |
| | | | | 43/107 |
| 2012/0279110 | A1 * | 11/2012 | Finotello ............. | A01M 25/004 |
| | | | | 43/131 |
| 2014/0223802 | A1 * | 8/2014 | Barrera ................... | A01M 1/14 |
| | | | | 43/107 |
| 2015/0289497 | A1 * | 10/2015 | Bennett ................. | A01M 1/106 |
| | | | | 43/107 |
| 2015/0366210 | A1 * | 12/2015 | Olson ................... | A01M 1/103 |
| | | | | 43/132.1 |
| 2016/0066554 | A1 * | 3/2016 | Hom ..................... | A01M 1/106 |
| | | | | 43/107 |
| 2019/0254270 | A1 * | 8/2019 | Blazer .................. | A01M 1/106 |
| 2021/0137091 | A1 | 5/2021 | Dolshun | |
| 2025/0113812 | A1 * | 4/2025 | Bouchonneau ......... | A01M 1/00 |

FOREIGN PATENT DOCUMENTS

| | | | | |
|---|---|---|---|---|
| CN | 215224099 | U | 12/2021 | |
| DE | 102008008241 | B4 | 6/2012 | |
| IT | SS20090015 | A1 | 5/2011 | |
| WO | 2004028248 | A1 | 4/2004 | |
| WO | WO-2012001442 | A1 * | 1/2012 | ............ A01M 1/106 |

OTHER PUBLICATIONS

Office Action issued on Jan. 27, 2026, in corresponding Chinese Application No. 202380017378.X, 11 pages.

* cited by examiner

[Fig 1]
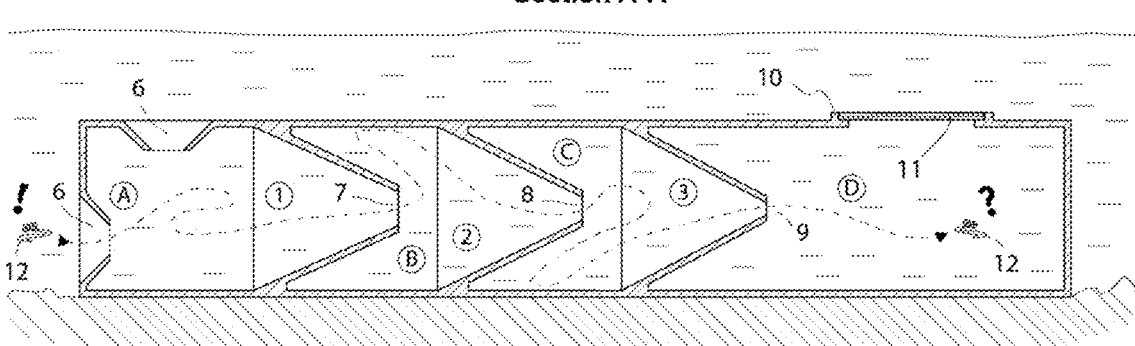
Section A-A
[Fig 2]
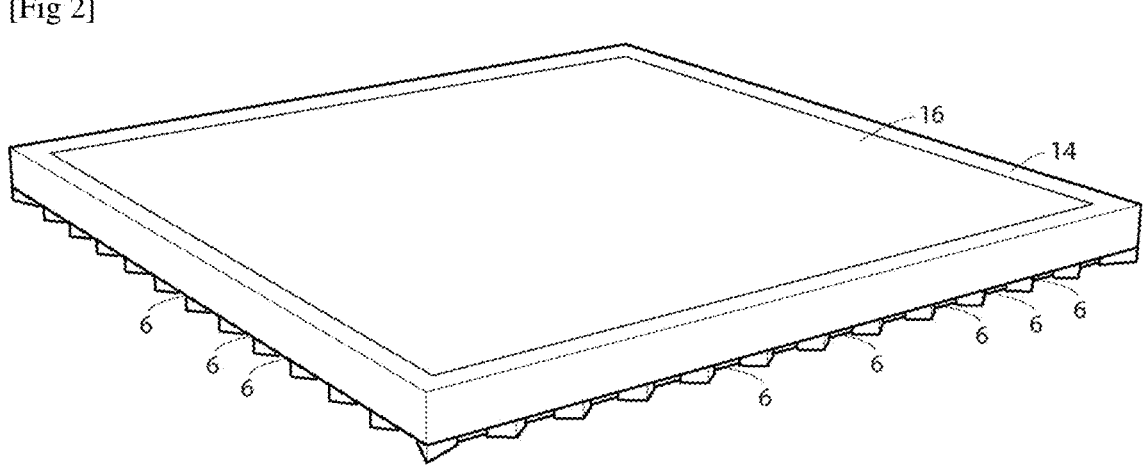

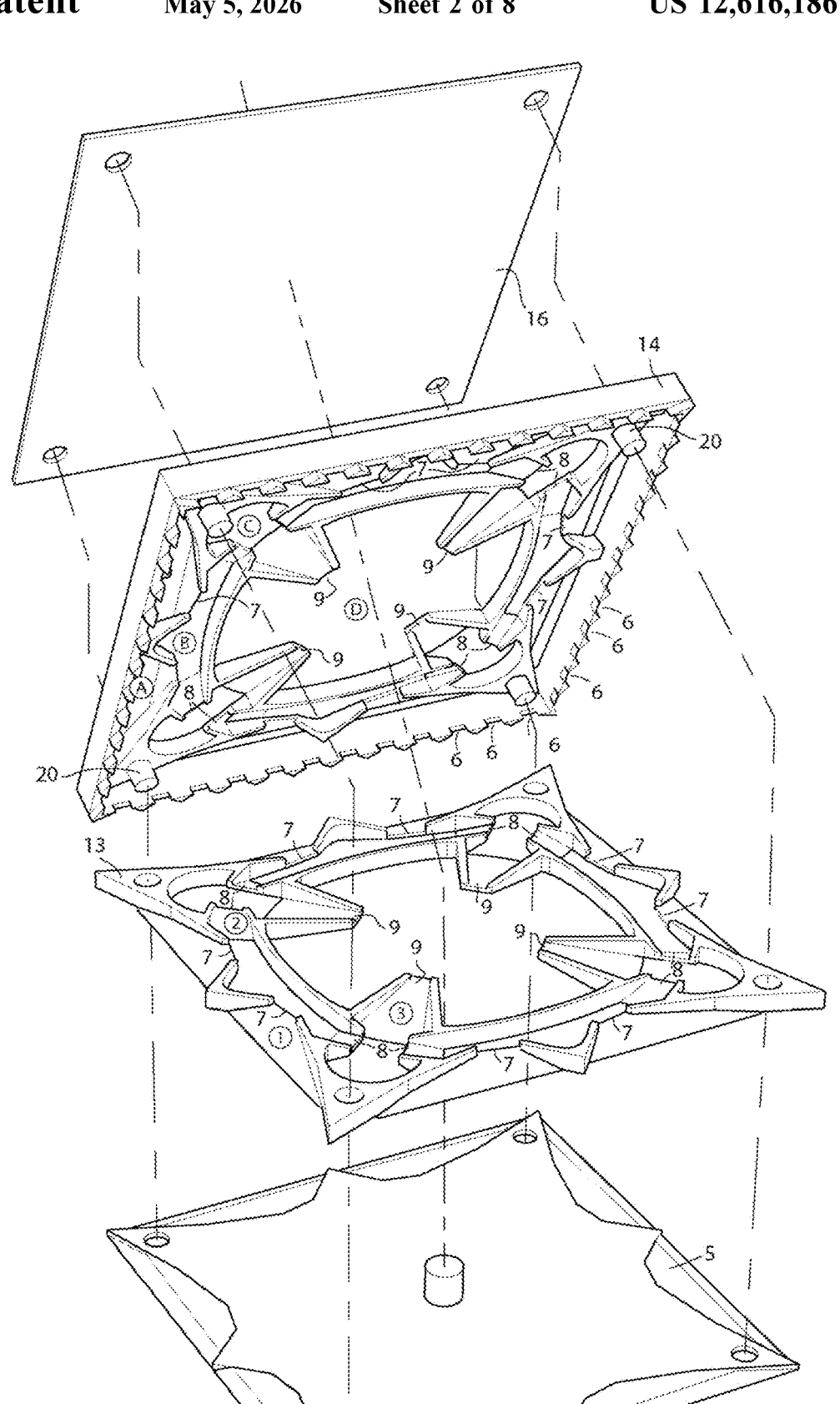
[Fig 3]

[Fig 4]
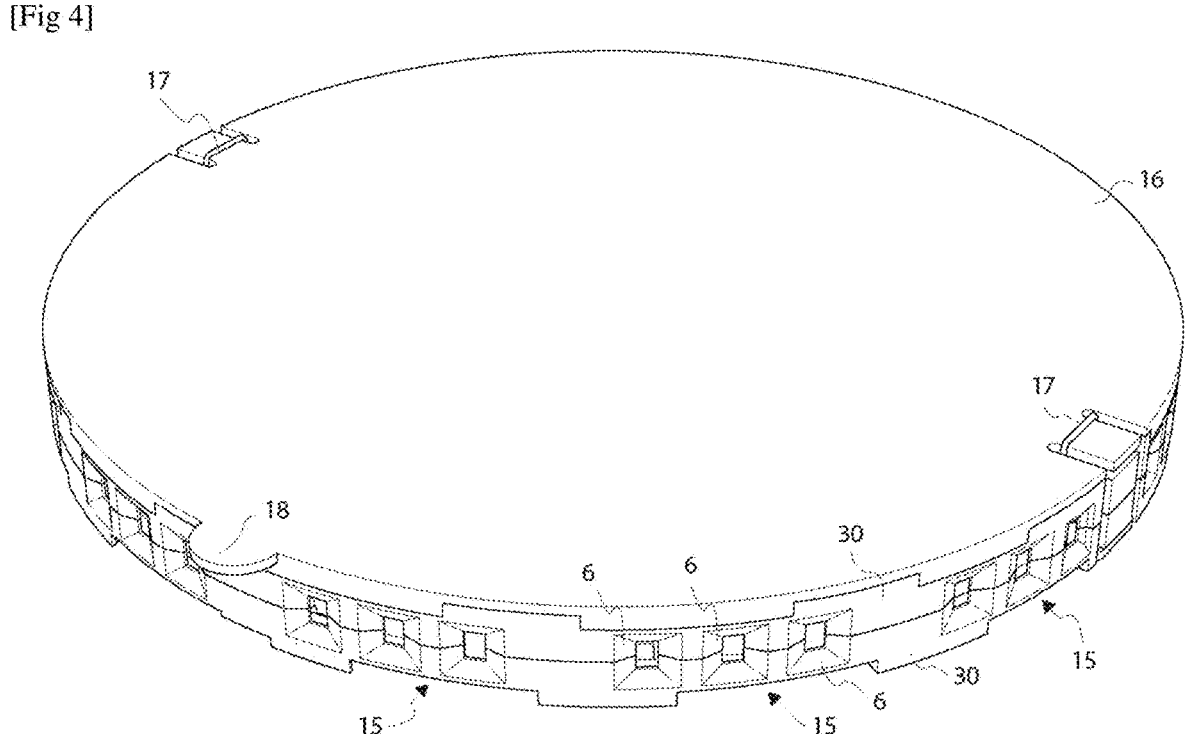

[Fig 5]
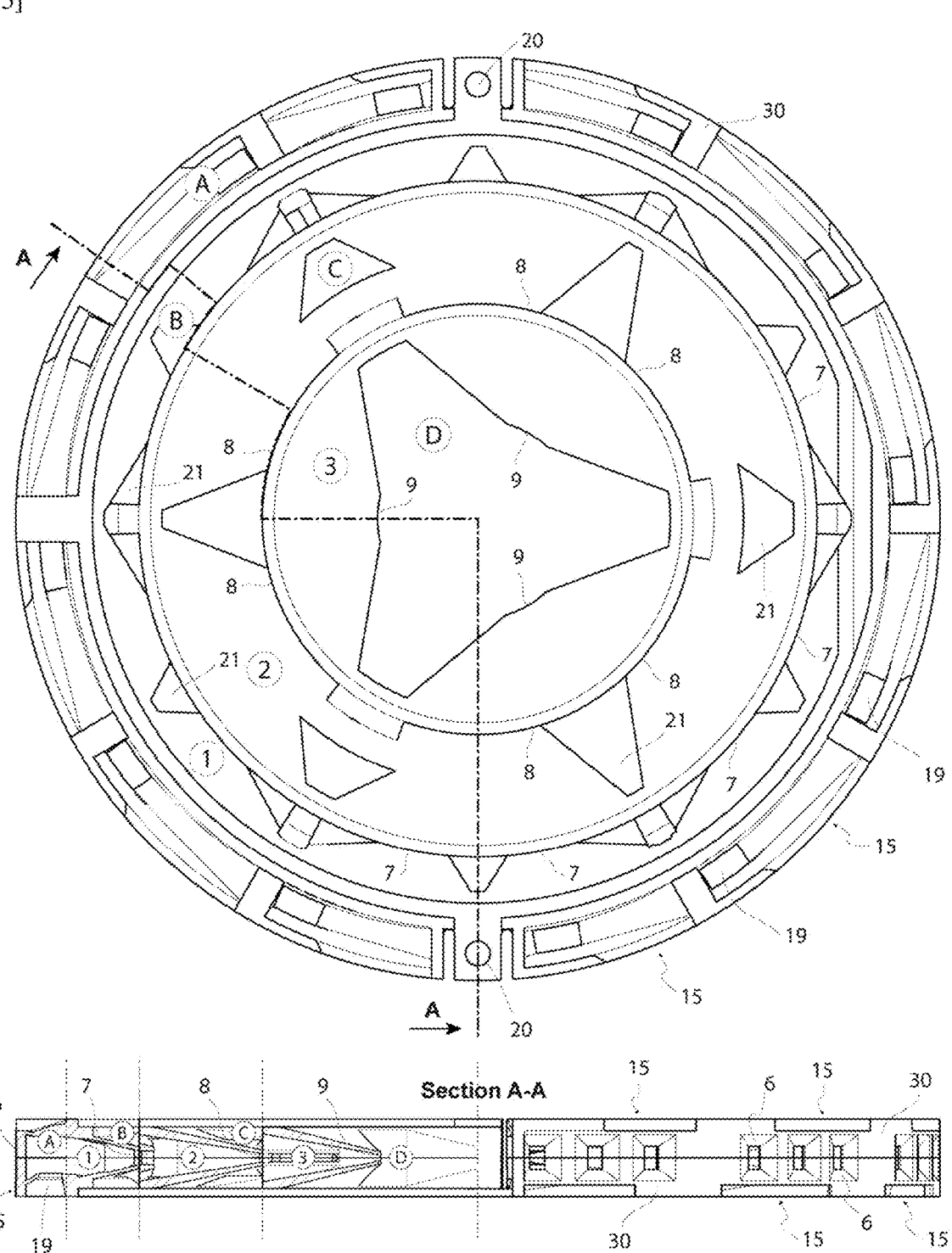

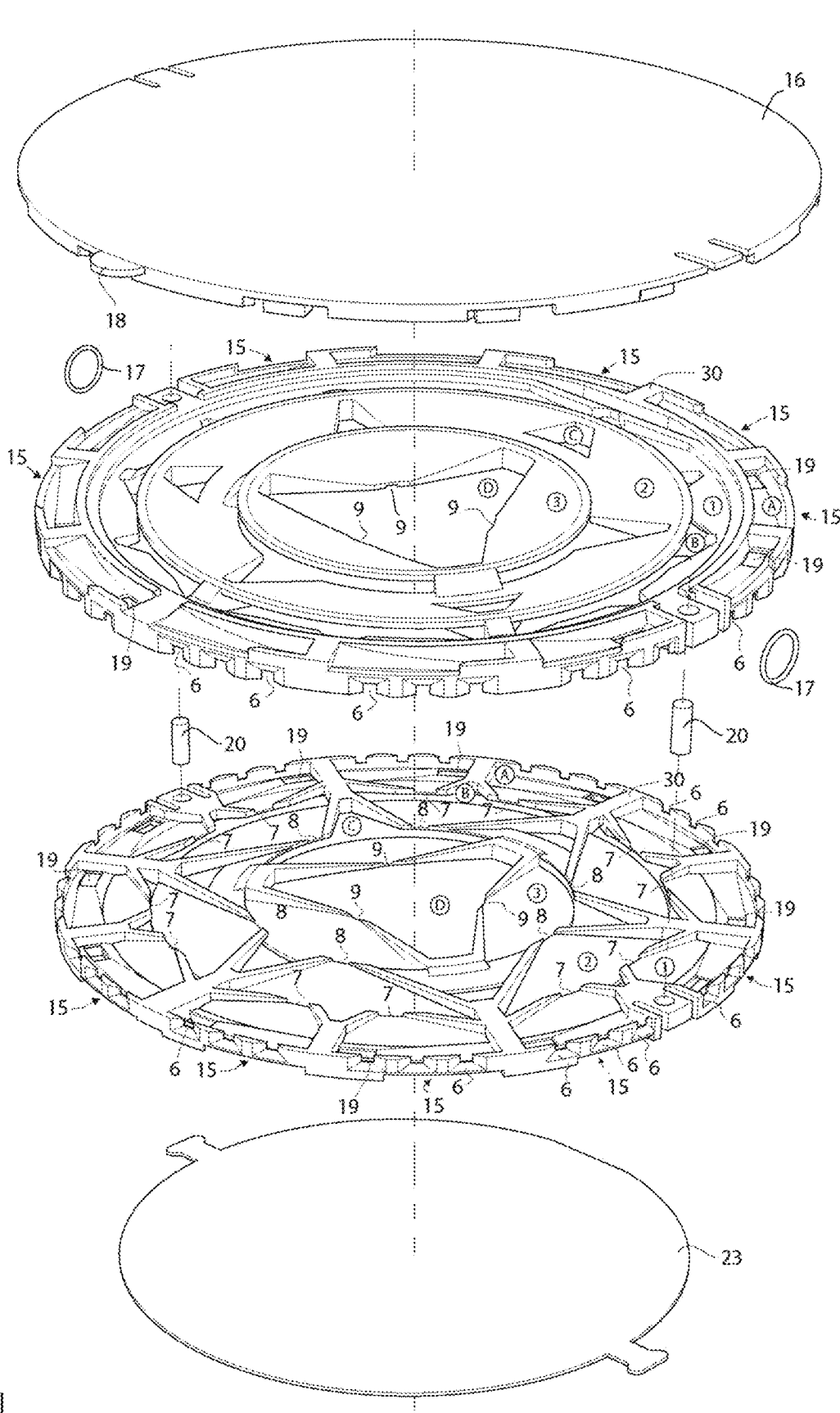
[Fig 6]

[Fig 7]
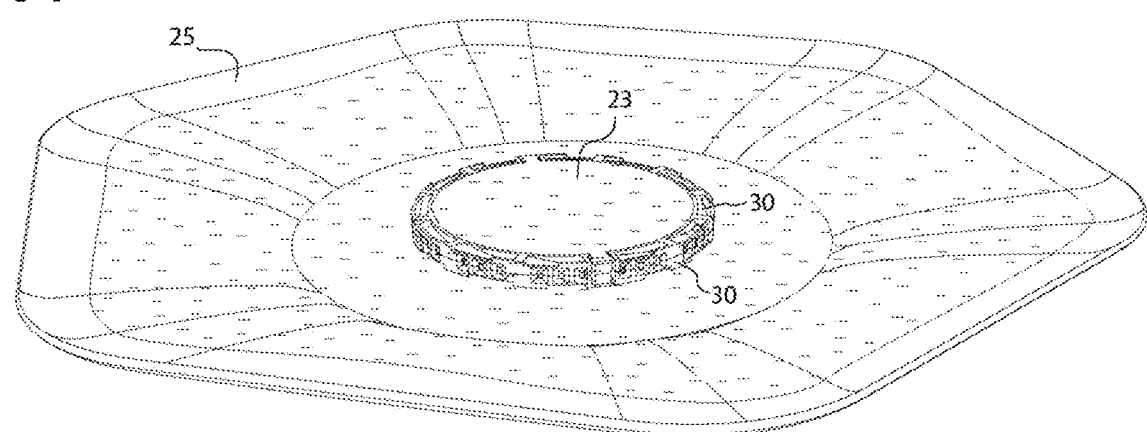
[Fig 8]
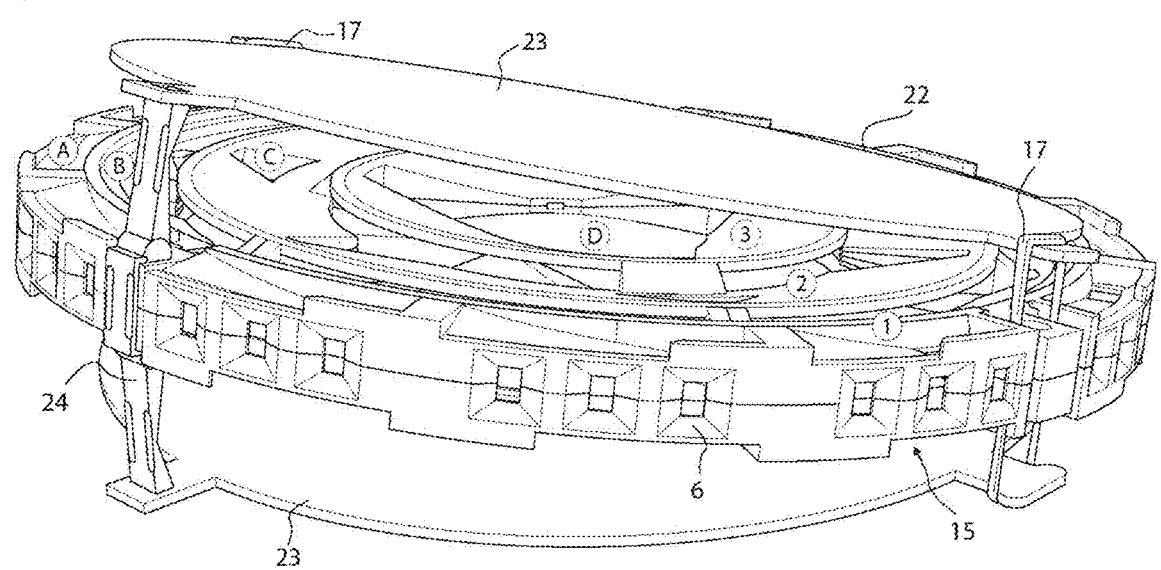

[Fig 9]
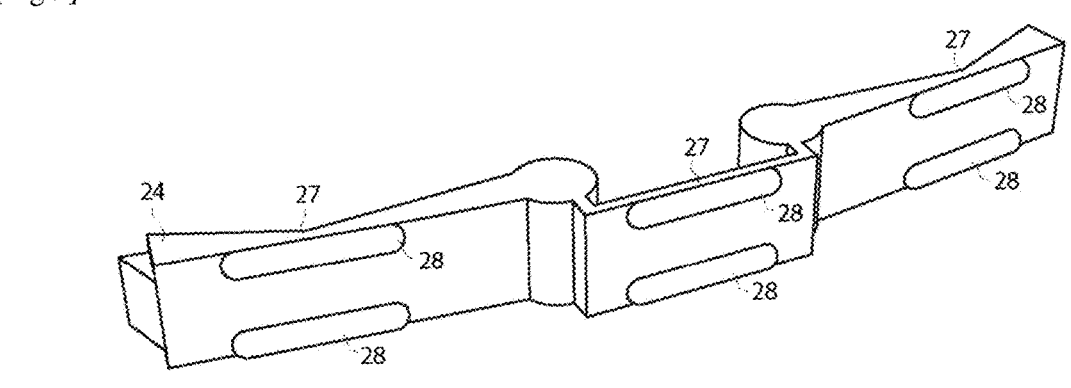
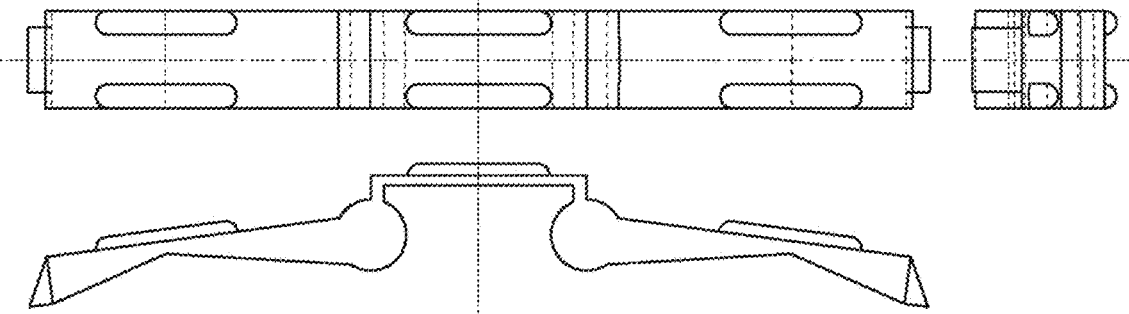

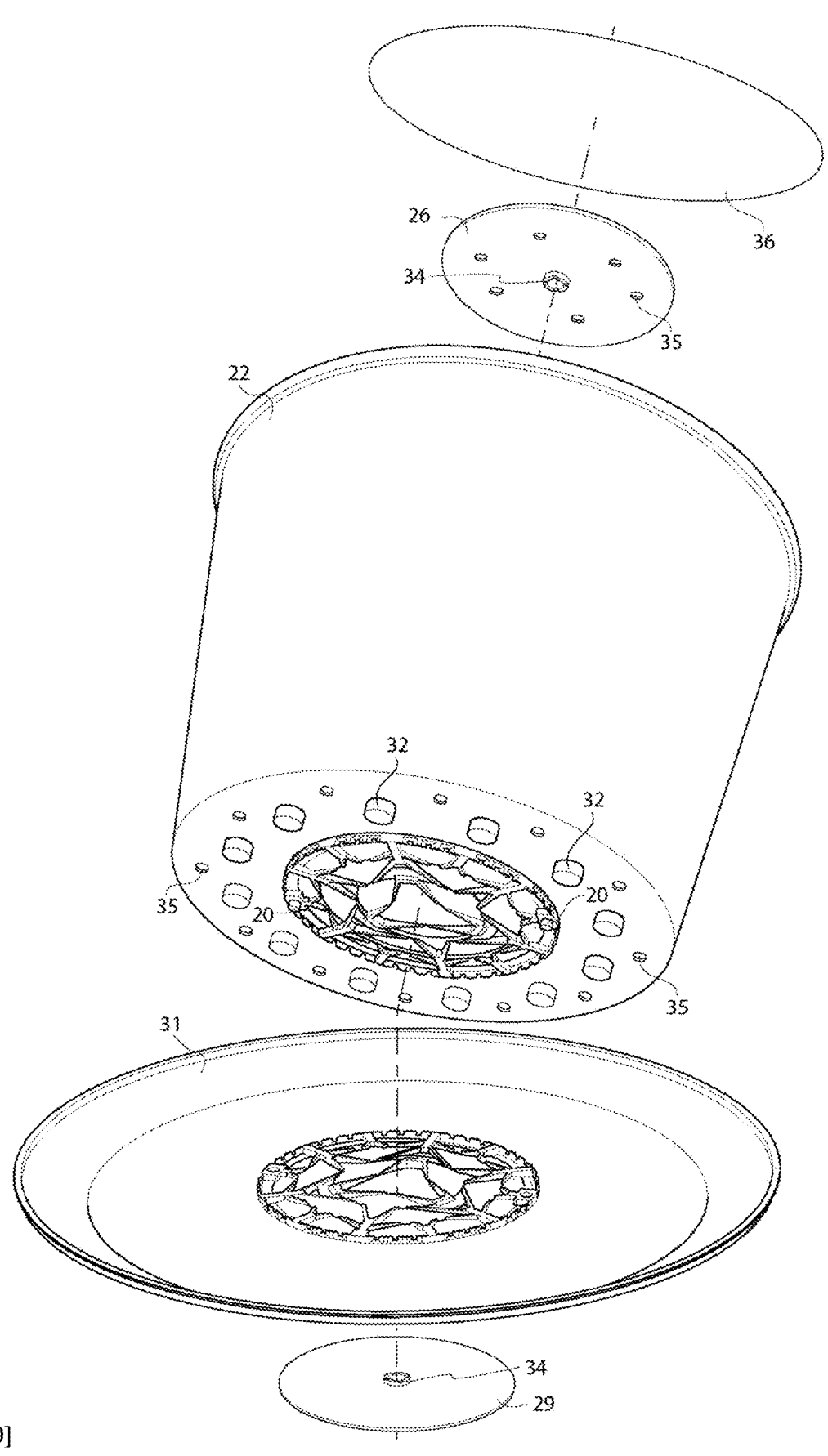
[Fig 10]

LABYRINTH FOR CAPTURING AND DESTROYING MOSQUITO LARVAE

CROSS-REFERENCE TO RELATED PATENT APPLICATIONS

This application is a U.S. National Phase Application under 35 U.S.C. § 371 of International Patent Application No. PCT/EP2023/051019, filed Jan. 17, 2023, which claims the benefit of priority of French Patent Application number FR2200340, filed Jan. 17, 2022, all of which are incorporated by reference, as if expressly set forth in their respective entireties herein.

Technical Scope of the Invention

The object of the present invention is a compact, thin aquatic trap for direct immersion in mosquito larvae breeding grounds, designed to capture them and then hold them underwater long enough to kill them through lack of air.

To achieve this, the trap features multiple niche entrances (6) to attract the larvae by providing shelter from light and predators.

These entrances lead to a series of compartments (A), (B) and (C) which form an anaerobic labyrinth leading to a dead-end chamber (D).

To guide the larvae's progress, the compartments communicate via horizontal truncated-pyramid vestibules (1), (2) and (3), which open into the next compartment in the open water, and whose successive exits (7), (8) and (9) have progressively decreasing dimensions until they reach the dead-end chamber (D).

As the internal shapes of the trap are conducive to trapping air bubbles when immersed, the invention can advantageously be perfected with a degassing system, consisting of vents (10) fitted with filters (11) as shown in FIG. 1, or a micro-pump to be handled during installation, or alternatively by manually expelling trapped bubbles, by closing the trap's top cover underwater.

PRIOR ART

There are approximately 3,000 species of mosquitoes, among which around 100 are vectors of diseases such as malaria, leishmaniasis, onchocerciasis, dengue fever, yellow fever, etc. Although in temperate countries, mosquitoes are more of a nuisance than a vector of disease, in the tropics they are the cause of significant morbidity and mortality, with almost 800,000 deaths worldwide every year.

The Life Cycle of the Mosquito:

Mosquito development comprises four stages: egg, larva, pupa and imago (adult insects).

Generally, the female mates only once in her life, but she periodically lays eggs in cycles of a few days throughout her life, after a blood meal essential for procreation. Each female lays between 30 and 300 eggs at a time, depending on the species. Egg development takes 2 to 3 days in the tropics, but can take longer in temperate zones.

After hatching, the larvae do not develop continuously: they pass through four different stages. In the first stage, the larva is about 1.5 mm long, and in the fourth, about 8 to 10 mm. The larvae are legless, but have a distinct head and body, covered with bristles. They are able to swim rapidly through the water, thanks to their characteristic "S"-shaped undulating body movements. Most have to surface periodically to breathe, using a siphon at the tip of their abdomen. The rest of the time, they dive for short periods in search of their food, which consists of yeasts, bacteria and small aquatic organisms living on the bottom of their nest.

In warm climates, the larval stage lasts 4 to 7 days, or longer if food is scarce.

At the end of its development, the larva transforms into a nymph, generally shaped like a comma. Nymphs don't feed and spend most of their time on the surface of the water, but will quickly dive to the bottom if disturbed. When the nymph reaches maturity, its integument splits at one end, revealing the fully-developed adult mosquito.

In the tropics, the pupal stage lasts from 1 to 3 days.

When conditions are favorable, the transition from egg to imago takes from 7 to 13 days.

Breeding Sites

The sites most frequently chosen for egg-laying are most often in the shade and associated with vegetation: upright plants, floating leaves or algae . . . . Ponds, seepage areas, the calm coves of slow-flowing rivers, rice paddies, the leaf axils of certain epiphytic plants and rainwater puddles are therefore the most likely to become nesting sites.

Deep artificial containers such as pots, tubs, cisterns and tanks with raised edges are generally less suitable than shallow water, and containers with indented edges.

Mosquito Control

As early as the nineteenth century, it was discovered that certain species of mosquito were responsible for transmitting disease, and in the absence of curative treatments, that the only solution to prevent spread was to destroy the vector.

Vector control is divided into two branches: The eradication of imagos (adult mosquitoes) and the destruction of aquatic mosquito larvae.

Eradication of Imagos

As mosquito control in the form of flying insects is not directly within the scope of the invention, we shall confine ourselves to summarizing the existing means used against imagos.

a) Protective Clothing

The simplest way to combat mosquitoes that bite during the day is personal mechanical protection based on wearing appropriate clothing of sufficient thickness and texture to prevent the insect's sting from penetrating. Legs can be protected by wearing thick socks and long pants. Long-sleeved shirts, fishnets, veils, scarves and hats also provide some protection.

Imagos are generally less attracted to light colors than dark ones.

All garments benefit from treatment with insecticide or residual repellent, and the resulting equipment is small, portable and easy to use.

These methods can offer significant protection against mosquitoes, and can sometimes limit disease transmission in a community if used by a significant proportion of the population.

b) Personal Surface Repellents

They are the second most common method of protection against mosquito bites.

Applied directly to skin, clothing or other fabrics such as mosquito nets, they chemically limit contact between man and insect. Once applied, the repellent can keep mosquitoes at bay from 15 minutes to up to 10 hours if applied to clothing.

Effectiveness and duration of action vary according to the type of repellent, the method of application, local conditions (temperature, humidity, wind, etc.), the mosquito's greater or lesser attraction to a particular person, losses due to perspiration, etc. . . . .

c) Natural Ambient Repellents

The most classic and widespread is surely the citronella extract candle, but there are other more or less organic products, sometimes even "folkloric" ones, and even bracelets with essential oils supposed to protect against mosquitoes.

It is not possible to list all traditional repellents and their instructions for use, especially as many have never been subjected to scientific study and their effectiveness has yet to be confirmed, as each species of mosquito has its own specific sensitivity.

d) Personal Mosquito Nets

They're a safe bet, and have been used for a very long time to protect against all insects, including haematophagous ones.

They are generally made from gauze or tulle, with a mesh size of 1.2 to 1.5 mm to prevent mosquitoes from penetrating. In hot climates, these fine-mesh fabrics have the disadvantage of not allowing good ventilation. Traditionally, linen, raffia and hemp have been used, but these materials are now being supplanted by cotton and synthetic fibers such as nylon, polyester and polyethylene. Mosquito nets are made in a variety of sizes and models, and should cover the whole person, giving enough room to avoid contact with the fabric.

Very large mosquito nets are also used by groups, as in Mauritania, who are accustomed to spending the evening together.

e) Chemical Insecticide Sprays

More modern, they can act at a distance, repelling or even killing imagos, since their active product is diffused in the air.

Available formats include insecticide coils, spray pads, liquid dichlorvos diffusers and aerosol cans for manual or timed use.

These are relatively inexpensive products that can protect several people at a time, but their use is limited to homes and other poorly ventilated areas. The substances used are mainly fast-acting shock insecticides that act to both repel and kill insects, such as allethrins, which belong to the pyrethroid group.

These compounds are considered safe for humans if used properly.

f) Ultrasonic Electronic Devices

On the market since the 1980s, they produce high-frequency vibrations toward off mosquitoes by reproducing the sound emitted by males, with a repellent effect on females already mated.

Also based on the emission of ultrasound, there are a large number of smartphone applications on the Internet claiming to be repellent, but with no real results.

A number of scientific studies have shown that all these devices offer no protection whatsoever against biting mosquitoes, and there have been several convictions for false advertising concerning these products.

g) UV Light-Based Devices

Ultraviolet mosquito repellents have been around for years. Whether indoors or outdoors, they are based on the principle of attracting insects with a UV lamp when it's dark, and then electrocuting them with an electric arc when they come into contact with high-voltage grids.

In the end, their overall effectiveness remains average, since without any additional attraction other than UV rays, it's very difficult to attract imagos and kill them. Yellow bulbs that claim to be repellent can be found on the market, but are not based on any precise physical principle.

h) Mosquito Racket

The principle of using a high-voltage electric arc is also used in "mosquito zappers" in the shape of a racket, fitted with a hopper initially made up of an interweaving of conductive electric wires, and powered by a small electronic voltage-multiplying battery assembly. The object literally "grills" the targeted mosquito, provided the user is dexterous enough to touch it.

These highly effective devices have a very limited field of action, as they are limited to the length of the arm of the user.

The commercial success of the object, linked to fierce competition between manufacturers and the safety standards imposed by importing countries, has meant that models have become increasingly sophisticated, both in terms of safety, with external protective grids, and other more or less questionable improvements such as rechargeable batteries, integrated lamps, bottle openers and even universal remote controls.

i) Suction Traps

More recently, indoor and outdoor mosquito traps based on electric suction have appeared on the market, initially for professional use.

Several types of lures are used to make these anti-mosquito devices attractive, but generally they diffuse a compound that reproduces human odor, or $CO_2$ directly to imitate a person's breathing.

Mosquitoes that come within range of the trap's mouth are then sucked into a lethal electrocution or dehydration device.

The location of these mosquito traps is crucial, and they should be placed close to areas where mosquitoes circulate, on the ground, close to vegetation, hedges, plants . . . .

Not all traps are created equal, and some are more effective than others, but some manufacturers promise up to 85% reduction in the garden mosquito population, continuously and ecologically.

All in all, these traps are extremely expensive to buy—sometimes costing several hundred euros—and require bait refills, which are often also charged at full price, plus the cost of electricity.

It's worth noting that some of these devices also offer an option for destroying larvae, so as to eliminate mosquitoes simultaneously at both stages of their life cycle, and thus block their proliferation more effectively.

j) the Architecture of the House

Construction methods can also be a way of limiting attacks by adult mosquitoes, which prefer to fly close to the ground, as fewer of them enter houses built on stilts or upstairs apartments.

Similarly, the smaller the openings in a home, and the fewer they are, the less likely mosquitoes are to enter.

In warmer regions, only modern homes with air-conditioning can remain completely closed at night, and for the rest, mosquito netting on doors, windows and other openings prevents insects from entering, while maintaining ventilation.

There are also slow-release insecticide paints for the home, which seem to offer a solution to the problem of rapid insecticide degradation on wall surfaces. They have a latex or polyvinyl acetate base and can be applied to walls by spray or brush.

k) Genetic Manipulation

Finally, there's the latest development in the fight against mosquitoes. A number of laboratories and companies, mostly American, have been working for years to modify the DNA of male or female mosquitoes, depending on the scenario, to make them sterile, thereby curbing the proliferation of the vector and eradicating the diseases it causes.

Several competing approaches are currently being tested in full-scale trials: making males sterile in the hope that the female fertilized once in her life by this male will ignore all others until she dies, producing only inert eggs, or modifying the DNA of males so that they only conceive other males, and this for several generations in succession . . . .

The results of the first pilot operations were generally mixed, but in May 2020, the US Environmental Protection Agency authorized the first wild releases of genetically modified mosquitoes in the Florida Keys wetlands.

1) in the Event of an Epidemic Crisis

In this particular situation, it is essential to rapidly reduce adult mosquito populations by spraying insecticides outdoors without delay.

In cities, areas with dense populations are generally treated with chemical shock insecticides.

In wetlands, these treatments can also be carried out using backpack-mounted foggers, or larger devices mounted on wheeled vehicles or aircraft.

Destroying Mosquito Larvae

Once the natural or artificial breeding grounds have been located, eliminating mosquito larvae is generally simpler and less costly than exterminating the adult imagos that emerge over the seasons, and is sometimes even the only effective method in cases of resistance to existing insecticides.

Unlike the destruction of imagos, the destruction of larvae has no immediate effect on the number of biting mosquitoes, and it can take several weeks before a significant reduction is observed. The following methods can be used to destroy larvae:

a) Transforming the Environment

For centuries, the most widely used means of destroying larvae has probably been the draining of swamps and other natural water bodies used as breeding grounds. More recently, land reclamation and other measures have been implemented in many regions, and have played an important role in the decline of vector-borne diseases.

These measures to modify the site by filling, open-cut or subterranean drainage are assimilated to a transformation of the environment because they are of a permanent nature.

b) Environmental Planning

Environmental improvements are different from transformations in that they are temporary and have to be repeated periodically.

The most important developments are systems that allow water levels to fluctuate through intermittent irrigation, for example, or hunting by deballasting, to sweep eggs and larvae onto the bank by means of a one-off massive influx of water.

We can also modify the salinity of the water through vestibule gates connected to seawater, lighten the vegetation on the banks, or eradicate aquatic plants to increase the current in the watercourses.

c) Historical Chemical Larvicide Treatments

These old-fashioned treatments are the opposite of natural, ancestral mechanical environmental methods.

It was only towards the end of the 19th century that the first chemical larvicides were used on breeding sites. This involved spreading petroleum oils in the form of a thin film covering the entire surface, as well as using an arsenic derivative, Schweinfurt green—also known as Paris green—in powder form to destroy larvae.

Both products kill larvae very quickly by asphyxiation and poisoning from toxic vapors, but their effect lasts only a few hours to a few days.

This process was used until the discovery in 1940 of DDT or dichlorodiphenyldichloroethane. This cheap product, extremely effective against mosquitoes in the home, was sprayed on the walls of houses and remained active for several months. In the 50s and 60s, very costly DDT spraying programs were organized to eradicate the most important vector-borne diseases-malaria, chagas disease, leishmaniasis, etc.—and to prevent the spread of mosquitoes. These short-lived eradication programs were highly successful, but were short-lived, as mosquitoes developed resistance to insecticides, forcing us to turn to new, ever more expensive products. What's more, these insecticides accumulated over time in animal and plant tissues, so they are virtually no longer used.

Petroleum oils are still used on a small scale today, as they remain of particular interest where mosquitoes have become resistant to insecticides, or where other measures, such as the use of predatory fish or site management by draining or filling, are impossible. What's more, these light oils are widely available, so they remain interesting for small-scale use, especially if they are natural.—Castor oil, coconut oil . . . —

When used correctly, these larviciding oils are non-toxic to fish, birds and mammals.

d) Synthetic Chemical Larvicide Treatments

Finally, often for economic reasons, other chemical larvicides are preferred to oils, primarily organophosphates—temephos, fenthion, and chlopyrifos—carbamates and pyrethroids, which are less persistent.

Pyrethroids are highly toxic to crustaceans and fish, and should not be used in the wild. These products disappear within a day, with the exception of organophosphates, which persist much longer.

Depending on the shape of the product, the release of the active ingredient is more or less rapid.

e) Bacterial Larvicides

In the presence of mosquitoes resistant to all chemical larvicides, we use bacterial larvicides. They come in the form of slow-release briquettes, which are much better than all other larvicides, as they float and slowly release their active ingredient to the surface.

These larvicides are sold in wettable powder form with a dispersant liquid. They are also available as suspension concentrates, where the liquid insecticide is mixed with water to form a sprayable suspension.

They also come in emulsifiable concentrates, where the insecticide is mixed with emulsifying agents and poured directly onto the surface of the water or sprayed on. Granules and pellets are also manufactured from grains of sand or absorbent material coated or impregnated with insecticide.

Generally, the products are applied by hand, with the liquids poured onto the surface of the larval nest using a bucket. Spraying campaigns are repeated every 1-2 weeks in most tropical regions.

f) Growth Regulators

These are chemical compounds that disrupt the development of larvae and pupae.

Although only slightly toxic to mammals, birds, fish and insects in the adult stage, they are highly toxic to crustaceans and other aquatic arthropods.

High in cost, they can be particularly interesting when the insects to be destroyed have become resistant to organophosphate larvicides.

Because of the product's rapid degradation in the environment, they too are applied in granulated, microcapsulated or briquetted form, so that the treatment lasts for several weeks.

g) Biological Control

Finally, when it is impossible to modify the environment in such a way as to prevent the vectors from returning to their natural egg-laying sites, the insects' habituation to chemical products and growing environmental constraints mean that the only sustainable solutions are biological control.

Biological control is based on the use of living organisms, or products and techniques derived from living organisms, capable of destroying mosquito larvae without polluting the environment.

It mainly involves introducing parasites, viruses, bacteria such as *Bacillus thuringiensis* H14, protozoa, nematodes, fungi or predators such as cyclopoid copepod crustaceans, Toxorhynchites, dragonflies, or larvivorous fish into the mosquito's biotope, all of which are highly effective.

The use of plants such as neem (Azadirachta indica), or fast-growing plants that float on the water surface, can also be biological means of eliminating egg-laying sites.

h) Larvae Traps

There aren't many anti-larvae traps on the market, even though they're an effective means of combating mosquitoes, because fewer larvae means fewer adult mosquitoes to exterminate.

Commercially available traps are egg-laying traps, which attract females about to lay eggs to a bucket-shaped device that provides an ideal space for mosquito larvae to develop.

By adding a special additive sold by the manufacturer to the water-filled trap, it becomes very attractive to mosquitoes looking for a place to lay, sometimes hundreds of eggs at a time.

Depending on the trap model, either the females are captured before they lay their eggs, or the larvae are held in a vertical basket system, consisting of partitions in the bucket.

The success statistics for these traps are high—up to 99% according to some manufacturers—but it's important to remember that these results only count the larvae born in the trap itself, and do not include larvae born in natural breeding grounds, probably just a few meters away.

It is a vertical bucket trap of this type that seems closest to the invention of this patent application, and we will return to its operating principle in detail, for comparison with the invention, in the "Disclosure of the Invention" section of this document.

i) Eliminating Clear-Water Breeding Grounds

Outdoors, a particularly close eye must be kept on drinking troughs, wells, ponds and puddles. Around dwellings, containers that temporarily fill with water during a rainstorm can, before running dry again, become breeding grounds for mosquitoes in the space of a few days or weeks, which are often vectors of dengue and yellow fever in subtropical environments.

To combat this scourge, larval breeding sites, made up of various containers, old tires and other garbage dumps, plants and objects of all kinds, must be eliminated, sheltered from the weather or covered.

As for indoor breeding grounds, the most common are vases, saucers under ornamental plant pots, ant traps (consisting of a water-filled bowl placed under each foot of the family guard), water tanks, containers and cisterns . . . .

The main advice is to avoid putting too much water in flower pots, to change the water in vases frequently, and for the water in ant traps, to add salt or a layer of oil, or even replace the water with grease.

For other potential outdoor breeding grounds, consisting of small, enclosed habitats, it is advisable to prevent adult mosquitoes from gaining access to them by fitting them with screens or removable covers so as not to impair water quality or interfere with the addition or removal of water.

These strategies for reducing the sources of mosquito proliferation require a major, longterm health education effort on the part of the community.

j) Treatment of Wastewater Breeding Sites

Ditches, marshes and canals, which contain stagnant water and organic waste, are natural breeding grounds in polluted water. In addition to draining marshes and filling in ditches and ponds, laying drains or taking semi-permanent measures, the banks of ponds and streams need to be cleared of undergrowth, and watercourses need to be cleaned from time to time.

Artificially polluted water breeding grounds are individual sanitation systems or stagnant water collections such as drains, latrines, septic tanks and cesspools.

The only way to combat mosquito larvae in the long term is to design and build these structures in accordance with state-of-the-art engineering practice, with adequate cover to prevent insects from entering or leaving.

k) Other Destruction Alternatives

In the case of natural immovable objects such as ponds, tree holes, hollow ends of fence posts and gutters, they should be regularly cleaned out or, failing that, filled in with sand, for example.

Occasionally, spreading oil, chemical larvicides or polystyrene beads to completely cover the water surface with impenetrable material may be considered if the above measures are not applicable.

Finally, if no other satisfactory method is available, effective and safe larvicides can be applied to the breeding sites.

All we need to do is reduce the sources of proliferation to prevent mosquitoes from breeding in and around homes.

Destroying the larvae protects households close to where the breeding sites were located, but the mosquitoes will continue to breed if there are other breeding sites nearby.

On the whole, these preventive measures are the most effective and economical way of reducing vector density by destroying the breeding grounds provided by natural or artificial receptacles.

Explanation of the Invention

The invention offers a compact, low-profile aquatic trap (of the order of a centimeter in height) for direct immersion in mosquito breeding grounds, designed to capture the larvae and possibly drown them by holding them underwater for a sufficiently long time. To achieve this, the invention consists of a series of compartments (A), (B), (C) which form an anaerobic labyrinth leading the larvae to a dead-end chamber (D), the whole constituting a flat multi-level creel.

The outer periphery of the invention features a number of niche entrances (6) designed to trap larvae by providing an easily-accessible hiding place offering shelter from light or predators.

These niche-like entrances give access to a series of compartments (A), (B) and (C), interconnected by vestibules (1), (2), (3) in the shape of a horizontal truncated pyramid with a rectangular base to guide the progress of the larvae. These vestibules (1), (2) and (3) systematically open into the next compartment at full water level, and their exits (7), (8) and (9) are of decreasing size until they reach the last dead-end chamber (D).

This succession of vestibules (1), (2) and (3) enables progressive capture, and provides numerous entry openings (6) and a very small exit opening (9). The whole system forms a flat labyrinth, and enables larvae to be directed in successive stages of increasing difficulty, towards the final asphyxia chamber without any exits (D).

As the internal shape of the trap is conducive to trapping air bubbles when immersed, the device can advantageously be enhanced with a degassing system, consisting of vents (10) fitted with filters (11) as shown in FIG. 1, or a removable cover (16) as shown in FIGS. 3, 4 and 6, to be manipulated underwater during installation, to manually expel any air bubbles.

As the invention is anaerobic, the larvae (12) die in the dead-end chamber (D) by asphyxiation, within a few hours, as they are unable to find the exit due to the particular shape of the tilted truncated pyramid-shaped vestibules (1), (2) and (3).

With its compact format, the invention can be plunged directly into containers of any size and shape, natural or artificial, even shallow or immovable on the ground, such as vases, ornamental plant pots, gutters, sumps, manholes, and other habitual sites, including those that are difficult to access . . . .

For larger volumes of water, the use of several evenly distributed devices ensures greater efficiency.

The invention is a novel "mechanical" biological means of combating the proliferation of mosquito larvae, offering a completely new technique in the vectorial control of diseases transmitted by these insects, by proposing natural capture and destruction of the parasite by drowning.

Based on hydrodynamic and statistical principles, the resulting invention is ecologically neutral, as it is bait-free, chemical-free, energy-free and requires no refills of any kind. It is therefore a totally clean mean of destruction.

Technical Problem

The mosquito larva is known to be particularly difficult to capture, with its record apnea time of several hours for meticulous exploration of traps, its forward and reverse swimming habits, its reflex to flee frantically in all possible directions when threatened, its ability to breathe in the smallest available air bubble, and an extraordinary talent for escaping through the tiniest openings.

For this escape champion larva, 4 modes of movement, linked to its behavior, are necessary to measure the technical problem of their capture, and thus understand how the invention works.

a) the Front "Vertical" Dive:

Calm and tranquil, the larva shuttles between the surface, where it breathes vertically upside down for a few minutes, and the bottom of the container, where it then settles horizontally. The transition between these two positions is slow, and simply involves sinking head first to the bottom, where it settles gently.

In the opposite direction, it rises from its horizontal position at the bottom by slowly taking off, first with its tail, then with its head, until it reaches the surface directly in a vertical position, in reverse.

It's a very energy-efficient mode of transport, and therefore very effective for long apneas.

b) "Horizontal" Exploration Forward:

Placed at the bottom of the breeding sites, the larva moves forward, its head pressed against the bottom, its body tilted a few degrees forward.

It's a swimming mode that allows them to sweep the entire surface of the breeding ground in search of food, or to penetrate horizontally through the entrances at the base of the trap, but also to methodically search for an exit in the event of capture.

c) Backward "Horizontal" Swimming:

The larva is able to undulate its body energetically in a characteristic "S" shape, propelling itself several centimeters from its starting point in just a few movements.

The frequency of the oscillation is around 0.5 hertz for an adult larva, and increases the smaller the larva.

Overall, the movement is slightly inclined, generally downwards or upwards by a few degrees, often resulting in the larva moving parallel to the bottom, or towards the surface.

Note that the resulting overall movement is always in reverse, i.e. tail first.

This horizontal swimming is systematically used to leave bright light sources, or simply to change feeding places, but also to simply turn back if the larva has ventured into a seemingly one-way access, such as a trap entrance that is too narrow for example.

d) the Back Panic Stroke:

Fearful by nature, the larva, alerted by a vibration in the air or surrounding water, or to get out of difficult situations, will perform a frenetic, high-frequency, "horizontal" S-shaped swim. It then begins a blind, disorganized flight in reverse in the opposite direction to the danger, to quickly escape from any predator.

Note that this panic movement is a gregarious behavior and that the more numerous and promiscuous the larvae, the more agitated the whole nest will be, as the slightest undulation of one larva inevitably provokes a chain reaction in the others.

Fleeing ripple frequency can reach 10 hertz for the smallest larvae and 3 to 5 hertz for an adult larva.

It's this mode of swimming that enables the larva to escape from enclosed spaces by scanning all possible internal volume, usually rapidly exhausting all combinations until it finds its way out.

Equipped with such reflexes and abilities, it's easy to understand why larvae manage to find their way out of simple traps, especially as these are small, of limited volume and therefore quickly explored.

Moreover, this "tail first" swimming action gives the animal the ability to sense, through contact with the bristles covering its body, objects located in the direction in which it is moving, i.e. in reverse, and thus to slip quickly into a possible exit or hiding place, to take shelter there.

These bristles, which cover the larva's body, give a perfect idea of the size of the passageway when moving forward, so that you know how far to penetrate it if it's big enough, and when to turn back if it's too tight. Any trap proposed for forward exploration should therefore have entrances of sufficient size to allow penetration without any contact.

Beyond this constraint of having entrances larger than the size of the targeted larvae if we want them to enter, the trap is required to have a large internal volume in proportion to the size of the larvae to be captured, to statistically prevent the larvae from finding the entrance/exit too easily by methodical exploration.

The WO 2004028248 A1 patent: "METHOD AND APPARATUS FOR INSECT ELIMINATION BY LARVES TRAPPING" for the "Bio AquaLab Mosquito Larvae Trap", which has been on the market for several years, perfectly illustrates these constraints. It should be noted that this trap is designed to capture larvae during their "vertical" shuttle, between surface respiration and bottom feeding, and is therefore based on a vertical creel principle.

Unfortunately, the requirement for commercial traps to be vertical, and the statistical constraint of large swim size and large openings, mean that they are incompatible with the majority of natural mosquito breeding grounds, which prefer to lay their eggs in shallow water and modestly sized containers.

Larvae trap manufacturers therefore offer devices consisting of a trapped container, generally in the form of a plastic bucket, containing a more or less sophisticated internal vertical netting mechanism.

These "classic" traps are therefore not traps for treating infested water, but rather "trapped containers" in which mosquitoes are offered an ideal environment in which to lay their eggs, with the aim of subsequently destroying their larvae.

These systems are designed to limit the number of eggs laid in natural breeding sites, on the assumption that the majority of hatchings will take place in these nesting traps.

In addition to the maintenance required for these traps (refilling with attractive chemical compounds, cleaning, checking the level, etc.), these traps do not treat pre-existing natural larval breeding sites and their curative effectiveness is therefore difficult to assess overall, as they only target eggs laid in the trap.

In the end, one might even wonder whether the high statistics posted by sellers of this type of product show the effectiveness of mosquito breeding rather than a means of combating their proliferation.

Technical Solution

The present invention provides a solution to this problem of the state of the art by treating "natural" egg-laying sites directly at source, as it does not aim to attract females to an artificial location.

In addition, the invention is based primarily on the larva's horizontal swimming behavior, which makes for a compact trap that can be very thin (less than a centimeter thick), and designed to be immersed directly and entirely at the bottom of even natural or shallow water reservoirs to be treated, as it does not include the container containing the water for the deposit.

In fact, in the invention, the entry orifices (6) form flared niches to exploit the larvae's living and swimming behaviors, which facilitate their penetration into the trap, i.e.:

The search for food, which is carried out by scanning the bottom of the water to graze on the nutrients essential to their development, the horizontal body tilted forward a few degrees, head on the ground, exploring all the way inside the trap through the niche entrances (6).

Even though they breathe on the surface, static and vertical, and can also dive vertically without much movement, their instinct to move towards the shade, and their need for food, encourages them to periodically resort to "horizontal" swimming, often on an oblique slope, to the point of swimming parallel to the bottom of the nest, and thus entering the trap in reverse, through one of the niches (6) at the trap entrances.

Finally, their sensitivity and reactivity to movements, vibrations, air currents, changes in light and other warning signals cause them to dive immediately to the bottom, before sliding sideways against the wall until they find refuge under an object, or in one of the trap's recessed entrances (6), also in reverse.

At this stage, once entered through the trap openings (6), these same life and swimming reflexes are exploited to progress through the various compartments (A) and (B) then (C) of the trap by:

The exploration of the compartment in forward motion, the horizontal body inclined a few degrees, head on the ground, quietly exploring the floor of its cell, until falling on the gentle slope of the lower face of the truncated pyramid of the vestibule (1), (2) or (3) leading to an exit (7), (8) or (9) to the next compartment.

A backward "horizontal" swim, also used when exploring the compartment, trying to swim in all possible directions. The natural inclination of a few degrees of this swimming mode naturally places the larva against the high or low edges of the compartment, all the more so as the trap is of reduced height, which provokes an exit through the vestibule (1), (2) or (3), towards the next compartment, in reverse, favored by the gentle slope of the lower face of the pyramid trunk.

Aggravated by the lack of air, the progressive oppression leads to stress in the animal, which rapidly results in a horizontal rotation, in a backward "panic" swim all around the top or bottom of the compartment, provoking a methodical exploration of the corners encountered, in search of possible exits, and inevitably leading to slipping through the vestibules (1), (2) or (3) into the next compartment, even if the passage is tiny.

It's in this situation that the larvae's real talent for slipping into localized holes by contact with their tails as they frantically swim backwards causes them to "force" their way into the last compartments.

These three behaviors make it unlikely for the larva to find the entrance to the compartment, which is located at mid-height, in open water, whereas the exit, favored by the pyramid-shaped profile lying between the bottom and the ceiling of the cell, is logically more accessible.

In fact, their inability to aim precisely at a chosen direction in reverse, combined with an inability to place their tail at a precise point in the compartment space, and moreover in full water, explains their great difficulty in emerging through the entrances they used.

What's more, their inability to undulate forwards makes it impossible for them to penetrate headfirst, in force, into the passageway they have used in reverse, propelled by their energetic tail undulations.

The invention therefore systematically features compartments with full-water inlets from the previous compartment, and smaller outlets to the next compartment, located at the end of the tilted pyramid between the ceiling and the bottom of the compartment.

The volume and shape of the compartments can be various, and don't correspond to any mathematical formula, but it's a good idea to reduce the internal volume to encourage the larva's rapid passage to higher levels of increasing difficulty, from which it will be all the more difficult to use the entrance to escape.

The last dead-end asphyxiation chamber (D) logically has the smallest entrances (9), and the fewest possible if the previous compartments have been combined in this way. This last chamber must also have a large volume of swimming water, to further reduce the probability of stumbling across one of the inlets offering a way back.

The size of the last openings (9) of this asphyxiation chamber (D) must be carefully calculated according to the target larva, as it is astonishing to see adult larvae measuring from 6 to 10 mm long and 1 to 1.5 mm in diameter, pass through sub-millimeter openings despite their size, with the tail entering first, then undulating their body energetically to slide all the way through.

The sizes of the exits (7), (8), (9) of the vestibules (1), (2), (3) are calculated in decreasing order, from the large trap entrance opening(s) to the dead-end chamber(s) with the smallest entrances (9).

Considering that this evolution of size is a straight line, the calculation equation to be applied for the calculation of vestibule exits, in both vertical and horizontal dimensions, respects the sequence Un of general term Un defined as follows:

$$Un = a.n + b$$

Where:

Un, represents the characteristic dimension of the opening:

a, the strictly positive directing coefficient of the line, chosen so that the difficulty of going back is increasing, taking into account the maximum larva size measured, the percentage of ease of entering the trap (corresponding to the extra space around the larva in the opening), and depending on the size and shape of the capture device, the total number of vestibules to pass through in the trap:

n being the vestibule number, starting from the asphyxiation chamber.

b, representing the characteristic dimension of the entrance opening to the final dead-end chamber, determined to enable a larva of the maximum size targeted by the trap to pass through it irreversibly, taking into account the larva's life expectancy.

It should be noted that this model for calculating the size of vestibule exits to be applied in both height-width dimensions does not concern trap entrances, as it does not take into account the size variation dependent on the position adopted by the larva during its entry penetration.

For maximum accessibility, the trap created by the invention must have the largest possible entrances, and is generally open around its entire periphery, generally in contact with the bottom of the breeding ground.

The free shape of the compartments, their internal organization and their number allow labyrinths of all shapes and sizes to be created.

By combining and associating these compartments geometrically, it is also possible to progressively reduce the number of vestibules to the asphyxiation chamber, which will then have as few as possible, to further reduce the probability of stumbling across an entrance offering a return to the previous compartments.

Benefits Provided

Based on statistical observations of larval behavior and scientific studies of their swimming processes, the invention requires no lures, no attractive or lethal chemical elements. It is simply based on the use of loopholes and weaknesses in their natural movement and escape reflexes, to trap them by keeping them underwater long enough to drown.

As the invention is composed of a series of compartments, this group of compartments forms a labyrinth which can be duplicated to be combined to form traps of any size and shape, adapted to the target larvae breeding ground container. In fact, the principle of the invention is versatile enough to be adapted to any type of water container, as the module compositions are infinite.

Vestibules outlet measurements and compartment volumes can be increased or decreased depending on the larvae species targeted, or their degree of maturation.

Totally submerged, the invention is invisible on the surface, so it's very discreet and aesthetically pleasing, as it doesn't detract from gardens or home interiors.

The very compact invention can be integrated directly into any container, such as longitudinal gutters (FIG. 2), garden basins and basins (FIG. 7), ornamental vases and flowerpots (FIG. 10), animal drinking troughs or others . . . .

Apart from this solution to the problem of capturing and retaining larvae in the trap, it has to be said that the immersion of such an object, with a rapid lethal aim, is complicated by the fact that the trap must be totally anaerobic, i.e. free of air bubbles to cause asphyxiation.

Larvae can breathe for days in the bubbles trapped in the labyrinth of interconnected compartments.

This feature gives rise to two variants of the invention:

1) The first variant consists in exploiting this property by keeping the larvae, trapped in the trap, alive, so as to use the invention as a fishing or live sampling tool (aquaristics, quantification of larval population samples for scientific or statistical purposes, etc.). Air will therefore be deliberately left in the dead-end chamber to allow the larvae to breathe in the trap for some time.

2) The second variant aims to drown the larvae, in which case the invention features an active "degassing" system when the trap is placed on the bottom of the water. The pyramid-shaped profile of the trap naturally generates a flow of gases towards the surface, allowing most of the bubbles to escape. The upper surface of the trap can be perforated with vents, the openings blocked by a filter of porous material such as tulle, gauze or a grid. Such an enhancement allows gases to seep to the surface, while preventing larvae from escaping from the trap through these exits.

An automatic degassing trap of this kind is therefore effective as long as water is present in the breeding ground, and will be operational again as soon as the water returns after a period of drying out, without needing to be attended to in any way.

Alternatively, trap degassing can simply be carried out manually, by closing the trap cover (16) under water, after removing the trapped air, which is sufficient for certain household applications such as window boxes, vases, or ornamental plant pots (FIG. 2 and FIG. 4).

SUMMARY OF THE INVENTION

The object of the invention is a compact, thin-walled aquatic trap with multiple entrances leading through a series of compartments to a dead-end asphyxia chamber, via vestibules with openings of decreasing size, in the shape of a horizontal truncated pyramid with a rectangular base, which open into the open water of the next compartment, a. Characterized in that it comprises:
   i.—Inlets form niches around the periphery of the trap's underside, preferably flush with the bottom, enabling larvae to hide in the event of a predator alert, or to escape from changes in ambient light, or simply to search for food.

ii.—One or more labyrinths consisting of a series of one or more internal compartments leading to one or more anaerobic chambers with no exit for asphyxiation, 1. Characterized in that they comprise:

a.—A series of cascading compartments communicating one after the other.

b.—From the horizontal-truncated-pyramid-shaped vestibule with rectangular bases between the compartments that make them up, which systematically open into the next compartment at full water level, and with exits of decreasing dimensions, to one or more anaerobic chambers with no exits for asphyxia.

iii.—One or more anaerobic chambers without exits for asphyxiation

1. Characterized in that they comprise:

a.—Entrance aperture sizes as small as possible in relation to the size of the target animal.

b.—As few entrance openings as possible.

c.—As high an internal volume as possible to prevent larvae from stumbling across inlets and using them as exits.

b. Advantageously, the invention can also be characterized in that it can include a "degassing" device to remove any bubbles that are unavoidable in view of the invention's complex internal shape, the aim being to prevent the larvae from breathing for days through the trapped bubbles, at the risk of them eventually finding an exit.

i. Characterized in that it can include:

1. Gas evacuation vents to the surface, fitted with filters to prevent larvae escaping from the trap.

2. Alternatively, a removable cover; either made of a porous material that allows gases to escape, or to be closed underwater after air has been manually evacuated from the trap to the surface.

3. Alternatively, a manual micro-pump, preferably a diaphragm pump, can be used to expel air bubbles from the trap under pressure.

c. The invention consists of a series of compartments forming a labyrinth capable of trapping larvae. Advantageously, this duplicated labyrinth enables traps of all sizes and shapes to be formed by association and combination, adapted to the target larval deposit container. This combinatorial organization makes it possible to adapt the device to any type of water container, and even to integrate the invention directly into the body of the container, or of objects likely to become larval breeding grounds (FIG. 10)).

The object of the invention is therefore a system designed to regulate harmful larvae populations in a totally natural and biological way, since it does not involve any use of electrical or mechanical energy, or any chemistry or refill of any kind according to the invention.

Finally, the invention can also be applied to a device for taking live aquatic larvae directly from their breeding grounds, for all aquarium, scientific, statistical or other purposes, provided that it is used without evacuating the internal air when placed at the bottom of the breeding grounds, in accordance with the invention.

BRIEF DESCRIPTION OF THE DRAWINGS

The invention will be better understood on reading the following description and examining the accompanying figures. The latter are presented by way of illustration and in no way limit the scope of the invention.

FIG. 1 shows a schematic representation of a preferred embodiment of the invention in the form of a minimalist larval trap with a very simple base, fitted with the advanced means of the invention, and intended for the purposes of technical demonstration of the operation of the device, according to the principle of the invention.

In this preferred embodiment of the invention, it is deposited at the bottom of the larval breeding grounds to form a "bottom trap". This use is by no means restrictive, as the trap can be fitted with floats for surface use, or anchored to the bottom at a height for use in open water, better suited to certain larval species, or other specific uses.

The elements making up the invention are clearly visible on this figure:

4 niche entries (6), i.e. 3 vertical and one horizontal on top of the trap in this preferred mode.

A labyrinth consisting of 3 cascading compartments (A), (B) and (C).

A series of vestibules (1), (2), (3), in the shape of a horizontal truncated pyramid with a rectangular base, systematically opening out into the open water, with outlets (7), (8) and (9) of decreasing size on both the horizontal and vertical axes, and laterally offset from one another.

A large-volume anaerobic dead-end asphyxia chamber (D) with the smallest possible inlets (9).

An evacuation vent (10) for any air bubbles trapped when the device is placed at the bottom of the water, equipped with a filter (11) to prevent larvae escaping through this orifice.

The diagram also shows the hypothesis of a larva (12) moving from the outside of the trap to the inside, for the sake of clarity.

FIG. 2 shows a schematic 3D perspective representation of a preferred embodiment of the invention in the form of a parallelepiped with a square base, 80 mm on a side and 8 mm thick, placed at the bottom of the larval deposit, and offering entrances (6) open around its entire perimeter for optimum accessibility. By way of example, this type of trap, evenly distributed at the bottom of a gutter, enables mosquito larvae to be eradicated directly in this often difficult-to-access breeding ground.

FIG. 3 shows a schematic 3D perspective exploded representation of the preferred embodiment of FIG. 2 to reveal its constitution and internal organization into compartments forming the labyrinth. The various compartments (A), (B), (C) and (D), vestibules (1), (2) and (3) and exits (7), (8) and (9) of decreasing size described in FIG. 1 are clearly visible.

FIG. 4 shows a schematic 3D perspective representation of a preferred embodiment of a mosquito larvae trap made of ABS-type hard plastic. This manually degassing trap, in the shape of a disc 120 mm in diameter and 10 mm thick, is designed to be placed between a pot of ornamental plants and its saucer filled with water, and fitted with the improved means of the invention. It is fitted with a wide, removable top cover to be closed under water after the air in the trap has been evacuated from above, in accordance with the principle of the invention. The width of this cover, which covers the inlets on the upper side of the trap, prevents the inlet compartments from being clogged by soil particles from the plant pot.

FIG. 5 shows a top view and half-section of the two assembled main parts of the preferred embodiment of the invention shown in FIG. 4, to reveal its organization, constitution and internal operation, in particular the sequence of trap compartments (A), (B) and (C) and the dead-end chamber (D), the vestibules (1), (2) and (3) and outlets (7), (8) and (9) of decreasing size, according to the principle of the invention.

FIG. 6 shows a schematic exploded 3D perspective representation of all the parts constituting the preferred embodiment of the invention shown in FIGS. 4 and 5, according to the principle of the invention.

FIG. 7 shows a schematic 3D perspective representation of the preferred embodiment and application of the invention used in a thin-walled container of any shape filled with water.

FIG. 8 shows a schematic representation of a preferred variant of the trap shown in FIGS. 4, 5 and 6, but made from PLA-type biodegradable hard plastic.

This variant is perfected for automatic installation by elastic closure of the top cover, which is held in the open position by a spacer made of a PVA-type plastic that dissolves in water in a few hours.

This version of the preferred embodiment of the invention is designed to be simply dumped at the bottom of swamps and other infested natural sites to be treated, and presents no risk of pollution by being totally biodegradable, and fitted with the perfected means of the invention.

FIG. 9 shows a schematic representation of the spacer of the preferred embodiment of the trap shown in FIG. 8, made from a PVA-type plastic that is water-soluble in a few hours. Like the body of the trap shown in FIG. 8, this variant of the preferred embodiment of the invention presents no pollution risk, being totally biodegradable.

FIG. 10 shows a schematic 3D perspective representation of the preferred mode of realization and use of the invention directly integrated into the manufacture of a manufactured object likely to become a larval breeding ground.

In this preferred embodiment of the invention, it is integrated into the bottom of an ornamental plant pot and its water-retaining saucer. This preferred mode of implementation not only avoids this major domestic larval breeding ground, but also transforms it into a tool for destroying and controlling mosquito proliferation, by destroying the larvae directly at source, according to the principle of the invention.

DETAILED DESCRIPTION

FIG. 1 shows a preferred "minimalist" embodiment of the invention to demonstrate that it is composed of compartments which, when placed end-to-end, create a labyrinth capable of fulfilling the overall function of capturing and killing aquatic mosquito larvae by drowning.

The first part of the invention consists of inlets (6) of shapes and sizes proportional to the larvae (12) targeted by the trap.

Even if these openings are generally located on the outer perimeter of the trap, depending on the species targeted, they can be located higher or lower to best match the behavior of the targeted larvae, or even at several heights, as in FIG. 1, which has one on the top of the trap, or FIG. 4, marker (6) on the periphery, and marker (15) flush with the bottom.

These trap inlets are flared to facilitate entry, and are shaped and sized to match the larva's swimming profile during penetration.

Also shown in FIGS. 4, 5 and 8, the holes (6) are generally square in shape, and are located halfway up the trap, as the targeted mosquito larva is accustomed to entering them in forward motion, during its foraging process, by entering horizontally, straight ahead.

The entrance holes to the niches (15) in FIG. 4 are large, horizontal rectangles, located at the very bottom of the trap edge, to enable the mosquito larva to find refuge there horizontally, undulating, swimming flat on the bottom, in reverse.

At the very bottom of the niches (15), the openings leading to the interior of the first compartment, and therefore of the trap itself, are upward-facing entrances (19), rectangular in shape and slightly larger than the dimensions of a target larva.

This shape and position are dictated by the mosquito larva's habitual reflex, which is to let itself rise to the surface, tail first, to breathe at the surface in reverse.

The size of all these entrances and their positioning on the trap are crucial: too large and the larvae will be too easy to pick up and leave the trap, too small or the wrong shape and the larvae won't enter, just as if the entrances are poorly positioned in terms of height.

The second part of the trap is the labyrinth, made up of a series of three compartments (A), (B) and (C), interconnected by vestibules (1), (2), (3) in the shape of a horizontal truncated pyramid with a rectangular base, which open out into the open water, and with exits (7), (8) and (9) that become increasingly smaller in both width and height.

This pyramid-shaped vestibule profile (1), (2), (3) vertically constrains the horizontal swim of the trapped mosquito larva, channelling it to the height of the rectangular-shaped exit ports (7), (8) and (9) of the compartments, calculated as accurately as possible for the size of the larva in a situation of undulating penetration, in reverse.

The calculated linearity of the sizes of the outlets (7), (8) and (9) of vestibules (1), (2), (3) makes it increasingly difficult for the larva to progress through the trap, while the animal's growing stress forces it to infiltrate ever-smaller openings.

The choice of 3 compartments to form the labyrinth is purely arbitrary and by no means an obligation linked to the operation of the invention, as this parameter can vary according to the general shape of the trap, the size of the target larvae, and the desired speed of larvae propagation in the trap.

Whereas a simple, single-level creel would, on the whole, be either ineffective in the face of hours of searching by the larvae that eventually find their way out, or difficult to penetrate due to small entrance openings, this cascade of compartments (A), (B) and (C) offers increasing difficulty of penetration, reconciling large entrance openings, large volume and tiny exits. Even when the larvae begin to escape, this system ensures that they always return inexorably to the anaerobic asphyxia chamber (D), where there are no exits.

FIG. 2 shows a schematic 3D perspective representation of a preferred embodiment of the invention in the form of a parallelepiped with a square base, 80 mm square and 8 mm thick, placed at the bottom of a larval breeding ground. It is fitted with a large number of inlets (6) open on all sides to offer optimum accessibility to larvae coming from all directions. The very low thickness of this trap means it can be used in very shallow waters. In this particular case, the distribution of several traps at equal distances from each other is recommended, for example, directly at the bottom of a gutter, a potential breeding ground that is often difficult to access in the case of multistory buildings. It's even possible to mold the trap directly into the plastic material making up the gutter, to benefit directly from the principle of the invention, for life.

FIG. 3 shows the internal composition of the preferred embodiment of the invention shown in FIG. 2. Note that this model is composed of two half-labyrinths of compartments (13) and (14) centered face to face on centering pins (20), and that it is equipped with a removable cover (16) enabling manual underwater degassing when installed, the use of this trap being intended at the bottom of the rectangular water-retaining tray of a balcony planter.

FIG. 4 shows a preferred embodiment of the invention in the form of a circular disc to be slipped between an ornamental plant pot and its water-retaining saucer, and forms a trap 120 mm in diameter and 10 mm thick.

For this specific application, the upper removable lid (16) has a diameter of 120 mm, i.e. a "covering" size designed to close the trap openings (15) located on the upper periphery to prevent any pieces of pot soil from clogging the trap compartment inlets.

In this preferred embodiment of the invention for ornamental plant pots, the top cover (16) is held in place by two elastic straps (17), so that by opening it with a finger using the pin (18), the trap fitter can release the air trapped in the trap, which returns to its original position and ensures the pressure required to seal the assembly, as well as the solidarity of the various components.

Alternatively, a spring system could have been used for this function.

In this preferred embodiment of the invention, the whole trap is made of ABS-type hard plastic for long life, and the lid can be made of transparent PMMA-type plexiglass to check efficiency and cleanliness at a glance.

FIG. 5 shows, for the same trap disk presented in FIG. 4, the internal organization of the labyrinth of compartments (A), (B) and (C), which are in portions of a circle, and not only that the size of the openings of the exits (7), (8) and (9) of vestibules (1), (2), (3) is decreasing, but also that the very number of these exits is decreasing.

Note that this model is composed of two half-labyrinths of identical compartments (30).

In addition, triangular portions of the compartments (21) have been hollowed out to allow degassing of the trap, which would otherwise remain full of air when filled with water.

FIG. 5 also shows the trap's central asphyxiation chamber (D). In this chamber, there are only three entrances (9), and they are very small.

The volume of this chamber is large compared with the other compartments, so that the probability of a larva finding its way out at random during its frenetic swim is low. Any entry into the asphyxiation chamber (D) is then considered irreversible, given the lifespan of the larva without oxygen at this stage of entry into the trap.

FIG. 6 shows an exploded view of all the parts of the trap for the disc shown in FIGS. 4 and 5:

The top cover (16) covers the entire trap.

The two identically shaped labyrinth halves (30) are centered opposite each other.

The two centering pins (20) ensure the exact positioning of the two labyrinth halves (30) opposite each other.

The base (23) of the trap has a diameter of only 100 mm to give free access to the inlets (15) giving access to the trap orifices (19).

The two elastic bracelets (17) provide the pressure required to seal the assembly and ensure the various elements that make up the trap stick together, i.e. (16), 2×(30), 2×(20) and (23).

FIG. 7 shows the particular use of the same preferred embodiment as shown in FIGS. 4, 5 and 6, but perfected by replacing the top cover (16) with the same 100 mm diameter bottom cover (23), thus freeing the top access opening (15)

for use in any container (25), even if the latter is immovable on the ground, such as a basin, fountain, bowl, trough or manhole.

In addition to preventive use or the curative treatment of a potential breeding ground, this use is also directly competitive with a commercial larvae trap if the device thus created is used to divert mosquito eggs from natural sites, in order to destroy the larvae according to the principle of the invention.

The invention, installed as a laying trap, offers the additional advantage over commercially available traps of being able to be used in any low-height container, even one that cannot be moved, infested or not, thus becoming a destroyer of mosquito larvae. As the container containing the trap water is not included in any way, the invention has a very reduced format, which makes it cheaper both in terms of manufacture and marketing costs than an existing commercial trap. What's more, the invention is highly discreet, being totally invisible from the surface.

As this type of application is conventional and commonplace, its principle will not be pursued further in this patent application.

FIG. 8 shows, from a 3D perspective, an improved preferred embodiment of an automatic degassing system of the invention shown in FIGS. 4, 5 and 6.

This improvement consists in the addition of a spacer (24), made of a plastic that dissolves rapidly in water, to keep the top and bottom covers open just long enough for the trap to degas. This improvement enables the trap to be disposed of without special installation in hard-to-reach pest control areas.

As removal from the site of use is generally complicated, the entire trap is designed to dissolve on its own in the water where it has been set after a few months, and is therefore made entirely of PLA-type biodegradable plastic with a programmed lifespan.

FIG. 9 shows the drawings of a spacer (24) designed to be made of a PVA-type plastic that dissolves in water in a few hours, for the preferred, improved version of the automatic degassing system shown in FIG. 8.

This spacer keeps the top and bottom covers open for the time required to degas the trap. It features a combination of low (27) and high (28) cross-sectional areas, enabling the trap to be programmed to dissolve and eject towards the outside of the device, so as not to interfere with its automatic closure. Once the spacer has been dissolved, the trap closes by itself by tensioning the two elastics (17), ready to be effective throughout the mosquito-laying season.

This trap is particularly suitable for treating industrial or urban wetlands equipped with traps and manholes, as well as swamps and other natural areas containing standing water.

The spacer model shown in FIG. 7, designed to dissolve in water, is purely indicative and is not detailed in this patent application, as its function is the only one that matters.

FIG. 10 illustrates a 3D perspective of a preferred embodiment, improved in that it is integrated directly into an ornamental plant pot (22) and its water-retaining saucer (31).

Since the invention is located half in the center of the bottom of the pot and half in the center of the bottom of the saucer, and is of constant size for all pot sizes, feet (32) compensate for the extra height of the trap and distribute the weight of the soil and plant around the trap.

To ensure that the two half-traps match, positioning pins (20) are fitted when the pot is placed on its saucer.

Depending on the manufacturing technique used for the two objects—in this case, plastic injection molding—it may be necessary to manufacture the covers (26) and (29) separately, and weld them in place at the end of the manufacturing process.

A slow, natural automatic degassing of the trap takes place through the vents (35) in the top cover, which also serve to irrigate the pot soil by capillary action through a sheet of filter material (36). As an added refinement, the well (34) allow nutrients and organic matter from decomposing larvae to be pumped up to the roots of the plants in the pot.

The square or disc shape chosen for these examples is by no means restrictive, but is dictated by the final destination of the invention and demonstrates that it can be declined in any combination and organization of compartments themselves of any shape, to constitute labyrinths of any size and shape, or even be directly integrated into the bottom of manufactured products as shown in FIG. 10. The invention can therefore also be integrated directly into the bottom of gutters, vases, basins, fountains, troughs or any other outdoor or indoor receptacle likely to contain water and be infected by parasitic mosquito larvae.

CONCLUSION

Over the last ten years, existing techniques have been adapted and new, simple, safe, well-suited and inexpensive methods have been developed to enable private individuals to protect themselves against the scourge of mosquito bites, but the principle used by the invention, as well as its mode of use and even operation, are completely new.

To be effective, vector control methods must have the following characteristics:

1. Be efficient;
2. Be affordable for the population;
3. Use readily available products and equipment;
4. Be easy to understand and implement;
5. Be compatible with local customs, attitudes and beliefs;
6. Be safe for users and the environment.

The choice of a method is therefore not based solely on effectiveness, but must also take into account its sustainability and affordability, as it is ultimately the community that often determines the nature of vector control adapted to their particular situation, finances, habits or customs, thus defining their degree of participation.

If we take these characteristics in the case of the invention:

1. Be effective;

Our prototypes have proven the total destruction of a sample site composed of 100 larvae in less than 36 hours, far less than the growth time of a larva, which is 7 to 13 days in the fastest cases.

2. Be affordable for the general public;

Mass-produced by plastic injection molding, or even thermoforming, the production of the invention presents no particular technical difficulties, enabling it to be brought to market quickly and cheaply in any factory producing plastic objects.

As the invention is much smaller in size than current vertical creel traps on the market, manufacturing costs are reduced to a fraction of the price of current traps, as are shipping and delivery costs, as the invention is very compact.

What's more, it requires no consumables such as baits or chemical elements to add to the initial sales price.

3. Use readily available products and materials;

The raw materials used are commonplace in the plastics industry, and can even be recycled. As the trap is invisible from the outside, its final appearance is of little importance.

As proof of the ease of production, our prototypes have all been produced using commercially available 3D printers, which are relatively accurate, making it possible to envisage even artisanal production in the most remote or isolated areas.

If biodegradable plastic is used, the behavior of the raw materials is well understood by the industry, and the trap can probably be produced from other, even more environmentally-friendly materials such as rice husks, wood waste composites, vegetable matter, or other biocompatible materials . . . .

4. Easy to understand and implement;

The development of the invention, in particular the discovery of its internal operating logic, was long and delicate, but the use and implementation of the product is child's play, even if the little "magic" aspect of "how it works" remains complex for the end user.

As for the principle of depriving larvae of oxygen to drown them, it's self-explanatory and requires no special explanation.

5. Be compatible with local customs, attitudes and beliefs;

The invention is directly compatible, as it can be integrated into a large number of everyday objects used worldwide. Nothing is more universal than a vase, an ornamental plant pot, or a gutter.

What's more, the invention is very discreet since it is invisible beneath the surface of the water to be treated.

It adds no chemical or other additives to the liquid, making it totally transparent in terms of its ability to modify the properties of the treated water, especially as food-grade plastic can be used for its manufacture.

Its use in no way alters the way water is managed and consumed in cisterns, tanks and other animal watering troughs, without interfering with its addition or removal.

6. Be safe for users and the environment.

Chemical-free, either rot-proof or biodegradable, made from food-grade plastic and/or recycled material, as the case may be, it works on a natural, biological principle, and is harmless to users and the environment.

Finally, to the interests of this aquatic mosquito larvae trap invention listed above, we can add:

The invention is adaptable to other pest species (water beetles, etc.) and to the degree of maturity of the target larvae, making it possible to further reduce the size of the trap, especially when the larvae to be captured are young.

The invention really acts at source, by directly treating natural larval breeding grounds (in flower pots, for example, which statistically account for 40% of sources of domestic mosquitoes in the West Indies), and not like egg-laying traps which just hope to divert some of the eggs.

The invention can be used in shallow water, where the majority of mosquito larvae are born, and is not available on the larval trap market.

The invention is durable and represents an investment over many years, as it is operational over time, and can be placed and moved as and when required.

The invention can be used even in natural or artificial containers that cannot be moved, and does not distort natural sites as it is invisible below the surface of the water.

Finally, several traps can be used simultaneously, evenly distributed across the bottom of a large water reservoir, to increase pest-killing power.

Certainly, vector control today consists much less of large-scale programs organized by public authorities than of local initiatives involving greater community participation. Moreover, many of the traditional methods used to prevent or combat vector-borne and other infectious diseases are poorly applied or have lost their effectiveness.

As a result of economic development, demographic change and environmental modification, or increased human migration, diseases are reappearing in new contexts or in more virulent forms.

Many pathogens are now resistant to common drugs, and their vectors have also acquired resistance to insecticides.

Methods involving the permanent modification of housing and other elements of the living environment can contribute to the fight against these diseases, which hinder economic progress and the well-being of the population in many parts of the world.

Mosquito-borne diseases are among the main causes of morbidity and mortality in many tropical and sub-tropical countries.

In addition to the toll they take in the form of premature death and disability, these diseases-malaria, filariasis, leishmaniasis, schistosomiasis, dengue fever, trypanosomiasis, etc.—constitute a major obstacle to economic development, due to the loss of countless hours of work, the high cost of treatment and the expense of vector control.

As well as being damaging to the environment, large-scale vector control campaigns are often impractical for financial or simply practical reasons.

For this reason, consideration has been given to methods that individuals and communities can implement themselves to guard against vector-borne diseases.

Unfortunately, there are very few such methods that can be profitably used by non-specialists.

The present invention aims to contribute to this fight by proposing a new, unprecedented method of purely mechanical and biological protection that can be used by individuals and communities, and which requires only a minimum of organization and training.

What's more, it's a simple, low-cost technology, requiring only a minimum level of "low-tech", and is safe for both the user and the environment.

All that remains is to adapt the possible uses of the invention to the local situation and to the population groups concerned by the fight against man's number one deadly predator, the mosquito.

The invention claimed is:

1. A compact, low-profile aquatic trap comprising:
    a) numerous niche entrances located around a perimeter of the trap that are configured to trap mosquito larvae by offering the mosquito larvae shelter from light and predators,
    (b) a series of interconnected compartments forming a labyrinth leading to at least one anaerobic asphyxiation chamber,
    (c) a series of vestibules between the series of interconnected compartments forming the labyrinth, in the shape of a truncated pyramid with a rectangular base opening into open water in the next compartment, with gradually decreasing exit dimensions, the shape of the series of vestibules, considering a mode of movement of the mosquito larvae, forcing the mosquito larvae to successively cross the series of interconnected compartments towards the at least one anaerobic asphyxiation chamber, wherein the at least one anaerobic asphyxiation chamber having the smallest possible entrances compared to the target larvae and a large volume of swimming water.

2. The compact, low-profile aquatic trap according to claim 1, further comprising:
    a degassing system configured to maintain the compact, low-profile aquatic trap in an anaerobic state, the degassing system being selected from the group comprising;
    a) vent holes on top of the compact, low-profile aquatic trap configured to allow gas to escape and equipped with filters configured to prevent the mosquito larvae from escaping,
    b) a removable cover held in place by two elastic straps configured to be manipulated underwater when setting the compact, low-profile aquatic trap to evacuate all bubbles,
    c) a pump system configured to be activated when setting the compact, low-profile aquatic trap to expel air.

3. The compact, low-profile aquatic trap according to claim 1, wherein the series of interconnected compartments forming the labyrinth and the at least one anaerobic asphyxiation chamber can be duplicated to be combined to form a compact, low-profile aquatic trap of any size and shape, adapted to a deposit container to be equipped, and enable integration within any outdoor or indoor container that could become a larval breeding ground.

* * * * *